United States Patent [19]

Rode

[11] Patent Number: 5,589,664

[45] Date of Patent: Dec. 31, 1996

[54] APPARATUS FOR CONTAINING ELECTRICAL COMPONENTS FOR SENSING OR MEASURING MAGNETIC FIELDS

[75] Inventor: John E. Rode, Fonda, N.Y.

[73] Assignee: Temper Corporation, Fonda, N.Y.

[21] Appl. No.: 124,818

[22] Filed: Sep. 21, 1993

[51] Int. Cl.$^6$ .................................................. H02G 3/08
[52] U.S. Cl. .................................... 174/52.1; 324/207.2
[58] Field of Search .................... 174/52.1; 361/600, 361/679; 73/774, 779; 324/200, 207.2, 207.21, 250, 262, 173, 174, 179, 219, 220, 239; 338/32 R, 32 H

[56] References Cited

U.S. PATENT DOCUMENTS

| | | | |
|---|---|---|---|
| Re. 32,520 | 10/1987 | Lace | 310/155 |
| 4,088,946 | 5/1978 | Charles et al. | 324/220 |
| 4,385,297 | 5/1983 | Schmitt et al. | 324/208 X |
| 4,392,375 | 7/1983 | Eguchi et al. | 324/208 X |
| 4,910,491 | 3/1990 | Gottling et al. | 338/176 |
| 5,117,182 | 5/1992 | Cecco et al. | 324/220 |
| 5,129,620 | 7/1992 | Castetter | 251/65 |
| 5,247,172 | 9/1993 | Riemer | 250/227.21 |
| 5,321,355 | 6/1994 | Luetzow | 324/207.2 |
| 5,337,617 | 8/1994 | Dimeff | 73/861.54 |
| 5,381,089 | 1/1995 | Dickmeyer et al. | 324/174 |

*Primary Examiner*—Kristine L. Kincaid
*Assistant Examiner*—Christopher Horgan
*Attorney, Agent, or Firm*—Heslin & Rothenberg, P.C.

[57] ABSTRACT

An apparatus for containing electrical components for sensing or measuring magnetic fields includes a tubular member made of a ferrous material such as austenitic stainless steel or aluminum. The tubular member is capable of receiving electric components therein for measuring magnetic fields. A cap made of a non-ferrous metal is affixed to one end of the tubular member and the electrical components are placed within the tubular member in close proximity with the inner surface of the cap. The tubular member is positioned in proximity to a rotor shaft or the like to enable the electrical components therein to measure magnetic fields to sense the rate and/or direction of rotation.

18 Claims, 3 Drawing Sheets

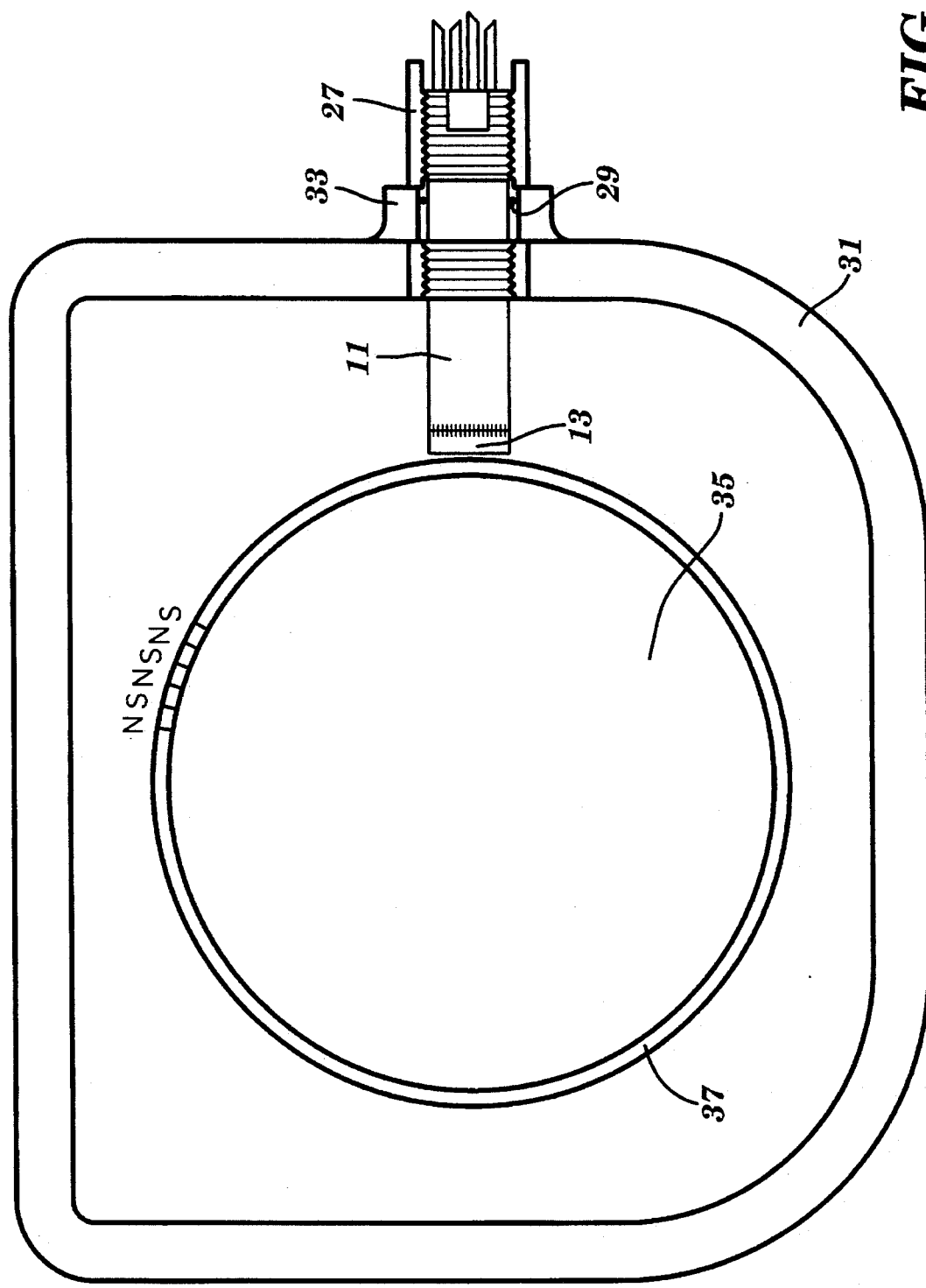

APPARATUS FOR CONTAINING ELECTRICAL COMPONENTS FOR SENSING OR MEASURING MAGNETIC FIELDS

BACKGROUND OF THE INVENTION

This invention relates to the field of electrical devices for sensing or measuring magnetic fields. In particular, the present invention is directed to an apparatus for containing electrical components for sensing or measuring magnetic fields.

Hall effect transducers are used to measure speed and/or sense the direction of rotation in various machines including pumps, motors, and engines including automobile engines. Hall effect sensors such as those described in the publication "Hall Effect Transducers" by MicroSwitch of Freeport, Ill. in 1982 are well known in the art. Hall effect transducers may be used to measure the speed or sense the direction of rotation of shafts having magnetic rings thereon such as those described in U.S. Pat. No. 5,224,259. Biased Hall effect transducers contain a magnet and may be used to measure the rotation of gears or sprockets made of a ferritic material. These types of devices are typically contained in an apparatus and mounted within the housing of a pump, transmission, motor or the like.

Containers for such electrical devices are generally holes in tough and strong non ferrous materials such as stainless steel. Strength and toughness is particularly required so that the end membrane thickness may be minimized to pass the magnetic flux most easily, and yet have structural integrity in the presence of significant fluid pressures. Typically, these sensor containers are made of a one-piece construction in the form of a closed end tube having a flat end thereof through which magnetic fields travel to be sensed by the Hall effect sensors. However, this one piece construction creates particular manufacturing problems because of the difficulty in manufacturing closed end tubular devices of a non-ferrous metal. In particular, it is difficult to create long and narrow holes in non-ferrous materials such as stainless steel. Since materials such as stainless steel have a low thermal conductivity, it is difficult to achieve sufficient cooling of a cutting tool such as a flat bottom drill or end mill used to create elongate hollow tubular members out of non-ferrous metals. Moreover, the use of non-ferrous metals such as stainless steel is relatively more expensive than ferrous metals such as carbon steel.

It is therefore desirable to create an apparatus for containing electrical components for sensing or measuring magnetic fields therethrough which are easily manufacturable and which is not difficult to drill elongate holes therethrough. It is also desirable to create such an apparatus by minimizing the amount of non-ferrous metals such as stainless steel required to be used therein. In this regard, it is also desirable to utilize ferrous metals for the container while still allowing the sensors therein to be capable of sensing magnetic fields.

The containers for these sensors typically have end portions which are made of a thin non-ferrous material so that transducers may be held in close proximity to a rotating magnet or rotating gear or sprocket.

SUMMARY OF THE INVENTION

The aforementioned goals are achieved by an apparatus for containing electrical components for sensing or measuring magnetic fields constructed in accordance with the principles of the present invention.

The apparatus includes a tubular member made of a ferrous material capable of receiving electrical components for measuring magnetic fields therein, a cap affixed to one end of the tubular member and being made of a non-ferrous metal, and means for mounting the tubular member into a housing wherein the cap is within the housing.

The cap may be made of either aluminum or austenitic stainless steel. Also, the tubular member may be made of carbon steel. The cap may be welded to the tubular member or affixed to the tubular member by an interference fit.

The means for mounting the tubular member into housing may include threads on the tubular section. The threads may be tapered for self sealing.

The tubular member may also contain a smooth surface above the threads which is capable of receiving a sealing means thereon. The sealing means may be an O-ring, gasket or the like. The tubular member may also comprise a second set of threads thereon located above the smooth surface which is capable of receiving a threaded collar to tighten a sealing means on the smooth surface against said housing. The tubular member may support a Hall effect transducer therein.

The cap may have a flat surface on its exposed end thereof and the tubular member may be coated with a sealant or anticorrosive material.

A heat conductive inner tube may be located within said tubular member to help cool the electrical components within the tubular member. The cap may be end milled to create a cavity therein and welded to the tubular member. The cap may also be machined to reduce the thickness of the flat surface. The Hall effect transducer may contain tabs thereon and the tubular member may contain a corresponding means for receiving said tabs therein for positioning said transducer. The means for receiving may include slots or the like.

BRIEF DESCRIPTION OF THE DRAWINGS

FIG. 2 depicts a schematic representation of the apparatus depicted in FIG. 1 mounted within a housing in a position to measure the rotation of a shaft within the housing of a motor, pump, transmission or the like.

DETAILED DESCRIPTION

Figure 1:
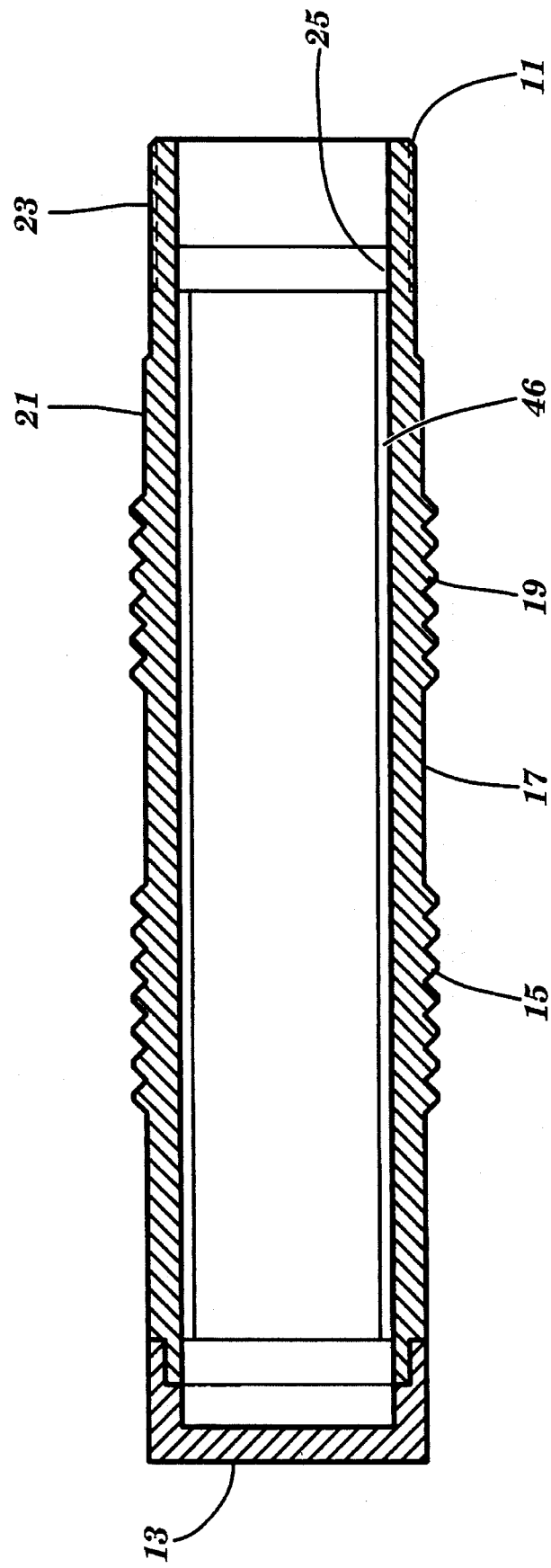
FIG. 1 depicts an apparatus for containing electrical components for sensing or measuring magnetic fields constructed in accordance with the principles of the present invention.

Referring to FIG. 1, an apparatus for containing electrical components for sensing and measuring magnetic fields contains a tubular member 11 having a thin metal end or cap 13 affixed to a first end thereof. The cap 13 must be made of a non-ferrous metal to allow magnetic fields to be sensed therethrough without interference. However, the tubular member 11 may be constructed of a ferrous metal such as carbon steel or the like. Typically, cap 13 is made of austenitic stainless steel or aluminum. The tubular member 11 may, therefore, be constructed separately from the cap 13 and the cap 13 and tubular member 11 may be affixed together by any suitable means such as welding or interference fit.

The tubular member 11 must be mounted into housing 31 (FIG. 2) such that the cap 13 is within the housing positioned in close proximity to a rotating shaft gear or sprocket, etc. to allow electrical components within the housing to measure the rotation of the same. Means for mounting the tubular member into a housing may include threads 15 which may be tapered and self-sealing. The threads 15 should be complimentary to threads within the housing wall for the tubular member 11 to be inserted therein. The tubular member 11 and cap 13 may constitute a portion of a fluid sealing boundary and therefore may be subject to hydrostatic and/or hydrodynamic pressures within the housing. Therefore, the tubular member must be sealed with the housing to prevent a loss of fluid pressure within the housing. For additional sealing of the apparatus, a smooth cylindrical surface 17 may be located on the outside of the tubular member 11 above the threads 15 towards the open end of the tubular member 11 as shown in FIG. 1. The smooth surface 17 may be capable of receiving a sealing means such as an O-ring or gasket depicted in FIG. 2.

Referring again to FIG. 1, a second set of threads 19 may be located on the outer surface of the tubular member above the smooth surface 17 towards the open end of the tubular member 11 as shown in FIG. 1. The second set of threads 19 may receive a threaded collar 27, depicted in FIG. 2, which may be tightened to the sealing means such as an O-ring 29 which is in turn tightened onto the housing 31 for additional sealing.

As depicted in FIG. 2, the collar 27 is sized to be received within lip 33 and the tubular member 11 threaded into the housing such that the cap 13 is in close proximity with a shaft 35, or gear or the like to measure the rotation thereof. The shaft typically contains a magnetic ring 37 containing a plurality of poles extending along the circumference of the magnetic ring. A wrench flat 21 depicted in FIG. 1, may be located above the second set of threads 19 towards the open end of the tubular member to enable the tubular member 11 to be rotated into proper position within the housing 31. The tubular member 11 may be coated with a sealant or other anticorrosive material to minimize wear and/or corrosion.

Figure 3A:
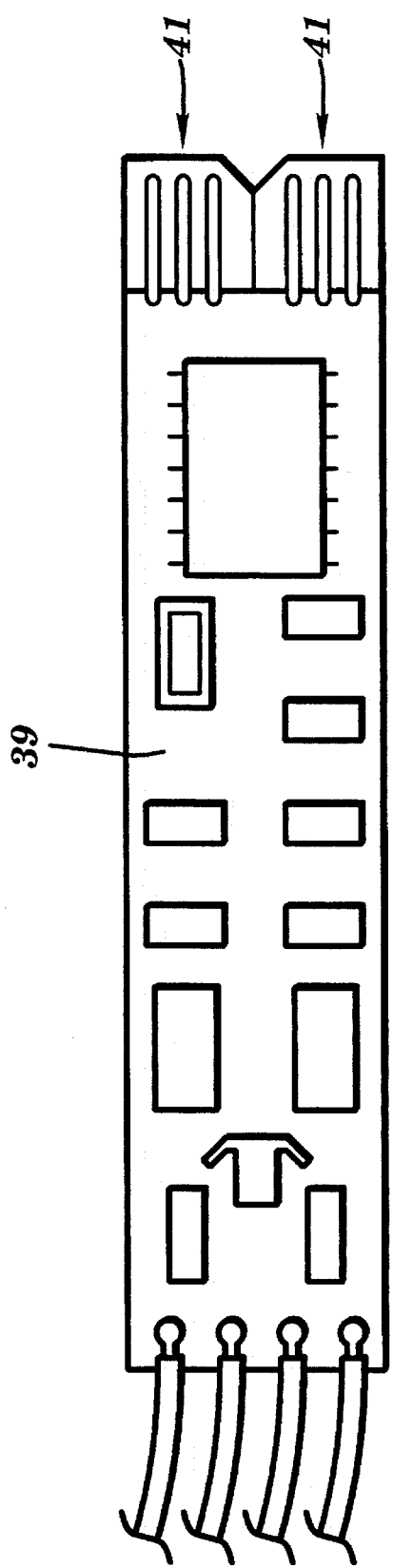
FIGS. 3A and 3B depicts a Hall effect transducer capable of being contained within the apparatus depicted in FIG. 1 when constructed in accordance with the principles of the present invention.
Figure 3B:
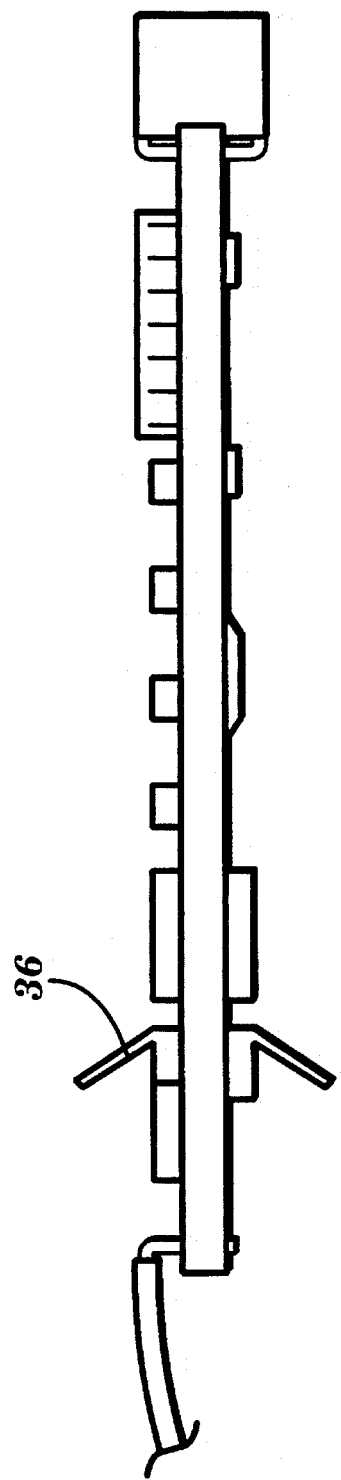

FIGS. 3A and 3B depict a typical Hall effect transducer containing tabs 36 extending therefrom. The tabs 36 may fit into a groove 25 of the tubular member 11 to maintain the transducer 39 within the tubular member 11 such that the hall effect sensors 41 of the transducer 39 are in close proximity with the inside surface of cap 13. The tabs 36 can serve as an electrical contact to provide a ground or reference voltage with the tubular member 11. The tabs 36 may also serve to orient the transducer in angular position relative to the wrench flats 21 (FIG. 1) so that the Hall effect sensors are in proper alignment with respect to the magnet ring when assembled for use. This is of particular importance when two sensors are mounted for detection of direction of rotation of the magnet ring.

The apparatus may be manufactured by welding the cap 13 to the tubular section 11. Small ridges, located on the end and tubular member, where each portion meets may be desirable to provide additional filler material for fusion into the weld zone. A flat ended tungsten carbide end mill cutting tool may be used to create the cap 13 from a piece of non-ferrous metal. After end milling, the cap may contain a flat surface which is thicker than desired, for example, 0.060 inches thick. After the cap is welded to the tubular member 11, the apparatus may be grasped by a collet with a precision stop that contacts the inner surface of the cap 13. A secondary machining cut may then be used to reduce the end thickness of the cap 13 to a desired thickness, for example 0.012 inches. This secondary machining will eliminate any heat distortion of the cap caused by the initial welding of the cap to tubular member 11.

In high temperature applications, a heat conductive copper tube 46, depicted in FIG. 1 may be located inside the tubular member 11 to help dissipate heat from the transducer therein.

The apparatus may also be used to contain a mechanical switch assembly which is activated by a magnet which is passed in proximity to the cap 13. The apparatus constructed in accordance with the principles of the present invention may be used for other applications than those specifically described herein. For example, a similar type of mechanical switch assembly may be employed within the apparatus wherein a moveable magnetic part may be located within the apparatus close to the inside surface of the end cap 13. Such uses, similar to Hall effect sensors, rely on the sensing of magnetic fields through the cap 13.

Although the invention has been depicted and disclosed in relation to the embodiments herein, it will be apparent to one of ordinary skill in the art that various modifications and substitutions may be made to the invention without departing from the scope of the invention as defined by the following claims.

What is claimed is:

1. An apparatus for containing electric components for sensing or measuring magnetic fields comprising:

a tubular member made of a ferrous metal, said tubular member being capable of receiving electrical components for measuring magnetic fields therein;

a cap affixed to one end of the tubular member, said cap being made of a non-ferrous metal;

means for mounting said tubular member into a housing wherein said cap is within said housing.

2. The apparatus of claim 1 wherein the cap is made of one of either aluminum or austenitic stainless steel.

3. The apparatus of claim 2 wherein the tubular member is made of carbon steel.

4. The apparatus of claim 1 wherein the cap is welded to the tubular member.

5. The apparatus of claim 1 wherein the cap is affixed to the tubular member by an interference fit.

6. The apparatus of claim 1 wherein the means for mounting the tubular member into said housing comprises first threads located on the outer surface of the tubular member.

7. The apparatus of claim 6 wherein the first threads are tapered for self sealing.

8. The apparatus of claim 6 wherein the tubular member contains a smooth surface above said first threads capable of receiving a sealing means thereon.

9. The apparatus of claim 8 wherein the tubular member further comprises a second set of threads thereon located above said smooth surface capable of receiving a threaded collar to tighten said sealing means on said smooth surface against said housing.

10. The apparatus of claim 1 wherein the tubular member supports a Hall effect transducer therein.

11. The apparatus of claim 1 wherein the cap comprises a flat surface.

12. The apparatus of claim 1 wherein the tubular member is coated with a sealant or anticorrosive material.

13. The apparatus of claim 1 further comprising a heat conductive inner tube within said tubular member.

14. The apparatus of claim 10 wherein said Hall effect transducer contains tabs thereon and said tubular member contains means for receiving slots therein for positioning said transducer.

15. The apparatus of claim 11 wherein the cap is end milled to create a cavity therein and welded to the tubular member.

16. The apparatus of claim 15 wherein the cap is machined to reduce the thickness of the flat surface.

17. A magnetic field sensing apparatus comprising:

a tubular member made of a ferrous metal, said tubular member being adapted to receive electrical components for measuring magnetic fields therein;

a cap affixed to one end of the tubular member, said cap being made of a non-ferrous metal; and said tubular member adapted to mount into a housing wherein said cap is within said housing.

18. A magnetic field sensing apparatus comprising:

a tubular member made of a ferrous metal, said tubular member being adapted to receive electrical components for measuring magnetic fields therein;

a cap affixed to one end of the tubular member, said cap being made of a non-ferrous metal; and said tubular member being mounted into a housing wherein said cap is within said housing.

* * * * *